Patented Aug. 21, 1934

1,970,865

UNITED STATES PATENT OFFICE 1,970,865

PROCESS OF PRESERVING FRESH RAW FRUIT

Walter M. Pease, Rochester, N. Y., assignor of one-half to John W. Pease, Rochester, N. Y.

No Drawing. Application October 14, 1932 Serial No. 637,786

5 Claims. (Cl. 99—8)

My present invention relates to the preparation of firm fruits, such as apples for the market and more particularly for the baking trade, whereby they can be delivered in condition for immediate use without further treatment, and it has for its object to provide a simple, inexpensive and rapid process of treating the raw fruit pulp so that it will maintain its fresh state as well as its fresh undiscolored appearance for a comparatively long period while at the same time retaining its juices so that it is convenient to handle and store. To these and other ends, the invention resides in certain improvements and combinations of parts, all as will be more fully described, the novel features being pointed out in the claims at the end of this specification.

Because of the bulk of apples in their natural state, as well as the capabilities of modern fruit machinery to rapidly pare, core and even seed cell them and slice them, there has been an ever growing demand for the fruit so prepared particularly among bakers and pie makers, for instance, who use them in great quantities. For many years, the ordinary dried apple, pared, cored, sliced, evaporated and packed in a dense mass in a more or less crude manner, fairly well met this demand, but dried apples had to be treated at least to the extent of soaking to restore their moisture content and something of their original bulk and softer texture. It is well known that raw apple pulp, exposed to the air for even a short time develops a brownish discoloration due principally to oxidation and in the attempt to counteract this to some extent it has been the practice in evaporators to run the sliced fruit through a gas treatment before drying. In this treatment, sulphur dioxide fumes are used and it is usually necessary to expose the pulp thereto for a relatively long period ranging from 30 to 50 minutes. Even with this, the resulting cure is only approximate and the product, while considerably condensed, is, as first stated, not in condition for immediate use in the culinary art.

Hence, the canning of apples has been more recently largely resorted to, either in solid pieces or in the form of applesauce. The advantage of conditioning for immediate use is here obtained, but the method is expensive due largely to the cost of the cans themselves as well as the machinery for filling them and in the end there is still a vast obvious difference between canned and fresh apples, the taste and appearance of which latter are greatly preferred by consumers.

This brings us to still more recent attempts to furnish the prepared pulp for more or less wide distribution in what approximates a really fresh state after paring, coring and slicing, that is, retaining the inherent moisture without hermetically sealing. So far as I am aware, these attempts have been limited to cold storage or chilling requirements. While the bulk is reduced, as in drying and canning, cans or similar liquid holding receptacles have to be used on account of the drainage of the natural juice and not only does the provision of these containers add to the cost that the evaporator did not have but the canner did, in much the same way, but cold storage in itself is expensive particularly when it is desired to have a large reservoir supply for wide distribution and fluctuating demands.

In the practice of my present invention, I practically eliminate the difficulties and extra expenses of all of these methods and preserve prepared apple pulp for relatively long periods in a substantially fresh state as regards appearance, texture and original juice content. I proceed in the following very simple manner:

I prepare a bath consisting of a solution of ordinary baker's meringue preparation dissolved in water to which I add a small quantity of oil of lemon. A working proportion of these ingredients consists of one teaspoonful of the meringue powder (dissolved in a small portion of the water) and two drops of oil of lemon to each gallon of water. The sliced apples are immersed in or passed rapidly through this bath after the latter has been thoroughly stirred or mixed and are then exposed for only two or three minutes to the sulphur dioxide gas treatment of the evaporating process above mentioned. The product is then placed in containers for storage, which containers need not be liquid-tight or sealed. Paper lined baskets will serve as no substantial drainage of juice occurs.

So treated, the pulp retains its light or natural color and its natural firmness for many weeks and it may be prepared in large quantities and held for distribution in the manner of cold storage fruit but without the expense of chilling. The component elements of the baker's meringue referred to are principally albumen mixed with one or more gums, such as gum acacia, gum karaya or gum arabic. These apparently form a very thin film upon the surface of the pulp filling the pores thereof, but I do not really know what chemical or other action takes place. The oil of lemon assists in retaining the flavor of the fruit.

I have also discovered that the results are improved if the apples are chilled before running them through the process as by holding them in cold storage for a day or two either before or after paring.

I claim as my invention:

1. A process of preserving sliced apples and like fruit in their fresh state through the use of the sulphur dioxide bleaching treatment which embodies coating the raw surfaces of the fruit with a thin solution containing gum in connection with such treatment immediately preceding their exposure to the dioxide.

2. A process of preserving sliced apples and like fruit in their fresh state through the use of the sulphur dioxide bleaching treatment which embodies coating the raw surfaces of the fruit with a meringue mixture in thin solution immediately preceding their exposure to the dioxide.

3. A process of preserving sliced apples and like fruit in their fresh state through the use of the sulphur dioxide bleaching treatment which embodies coating the raw surfaces of the fruit with a thin solution containing albumen preceding their exposure to the dioxide.

4. A process of preserving sliced apples and like fruit in their fresh state through the use of the sulphur dioxide bleaching treatment which embodies first chilling the pulp to approximately freezing temperature and then coating the raw surfaces thereof with a thin solution containing a gum immediately preceding their exposure to the dioxide.

5. A process of preserving sliced apples and like fruit in their fresh state through the use of the sulphur dioxide bleaching treatment which embodies coating the raw surfaces of the fruit with a thin solution containing gum immediately preceding their exposure to the dioxide and limiting the period of the dioxide treatment to approximately three minutes.

WALTER M. PEASE.